United States Patent
Koefinger et al.

(10) Patent No.: US 9,340,273 B2
(45) Date of Patent: May 17, 2016

(54) FRAME ELEMENT, AIRCRAFT COMPONENT ASSEMBLY SYSTEM AND METHOD OF FITTING A COMPONENT IN AN AIRCRAFT

(75) Inventors: Christian Koefinger, Kufstein (AT); Joachim Metzger, Opfingen (DE); Michael Auburger, Erlenmoos (DE)

(73) Assignee: Airbus Deutschland GmbH, Hamburg (DE)

( * ) Notice: Subject to any disclaimer, the term of this patent is extended or adjusted under 35 U.S.C. 154(b) by 523 days.

(21) Appl. No.: 12/380,074

(22) Filed: Feb. 23, 2009

(65) Prior Publication Data
US 2009/0272849 A1    Nov. 5, 2009

Related U.S. Application Data

(63) Continuation of application No. PCT/EP2007/007362, filed on Aug. 21, 2007.

(60) Provisional application No. 60/827,355, filed on Sep. 28, 2006.

(30) Foreign Application Priority Data

Aug. 22, 2006    (DE) .......................... 10 2006 039 290

(51) Int. Cl.
*B64C 1/06*    (2006.01)
*B64C 1/40*    (2006.01)

(52) U.S. Cl.
CPC . *B64C 1/066* (2013.01); *B64C 1/40* (2013.01); *Y10T 29/49904* (2015.01)

(58) Field of Classification Search
CPC ........... B64C 1/066; B64C 1/40; B64D 13/08
USPC ............. 244/119, 120, 131; 24/117 R, 118.1, 24/118.2, 118.5, 129.1, 131, 132, 119, 24/117 A
See application file for complete search history.

(56) References Cited

U.S. PATENT DOCUMENTS 2,233,969 A * 3/1941 Woods ........................ 244/123.8
3,071,217 A * 1/1963 Gould .......................... 52/403.1
(Continued)

FOREIGN PATENT DOCUMENTS

EP    1 468 907    10/2004
GB      650859     3/1951
(Continued)

OTHER PUBLICATIONS

International Search Report and Written Opinion, WO 2008/022773; Feb. 28, 2008; Airbus Deutschland GmbH.
(Continued)

*Primary Examiner* — Adriana Figueroa
*Assistant Examiner* — Jessie Fonseca
(74) *Attorney, Agent, or Firm* — Taft Stettinius & Hollister LLP

(57) ABSTRACT

A frame element (10; 10') for use in an aircraft component assembly system (46) is attachable to an aircraft structure (36) and comprises at least one fastening device for fastening at least one aircraft interior component (34) or at least one insulation pack (52) to the frame element (10; 10'). An aircraft component assembly system (46) comprises a plurality of such frame elements (10; 10'). In a method of fitting a component (34, 52) in an aircraft, a frame element (10; 10') is provided. At least one interior component (34) or at least one insulation pack (52) is fastened to the frame element (10; 10'). Then the frame element (10; 10') having the at least one interior component (34) or the at least one insulation pack (52) fastened thereto is attached to an aircraft structure (36).

20 Claims, 10 Drawing Sheets

(56) References Cited

U.S. PATENT DOCUMENTS

Figure 1:
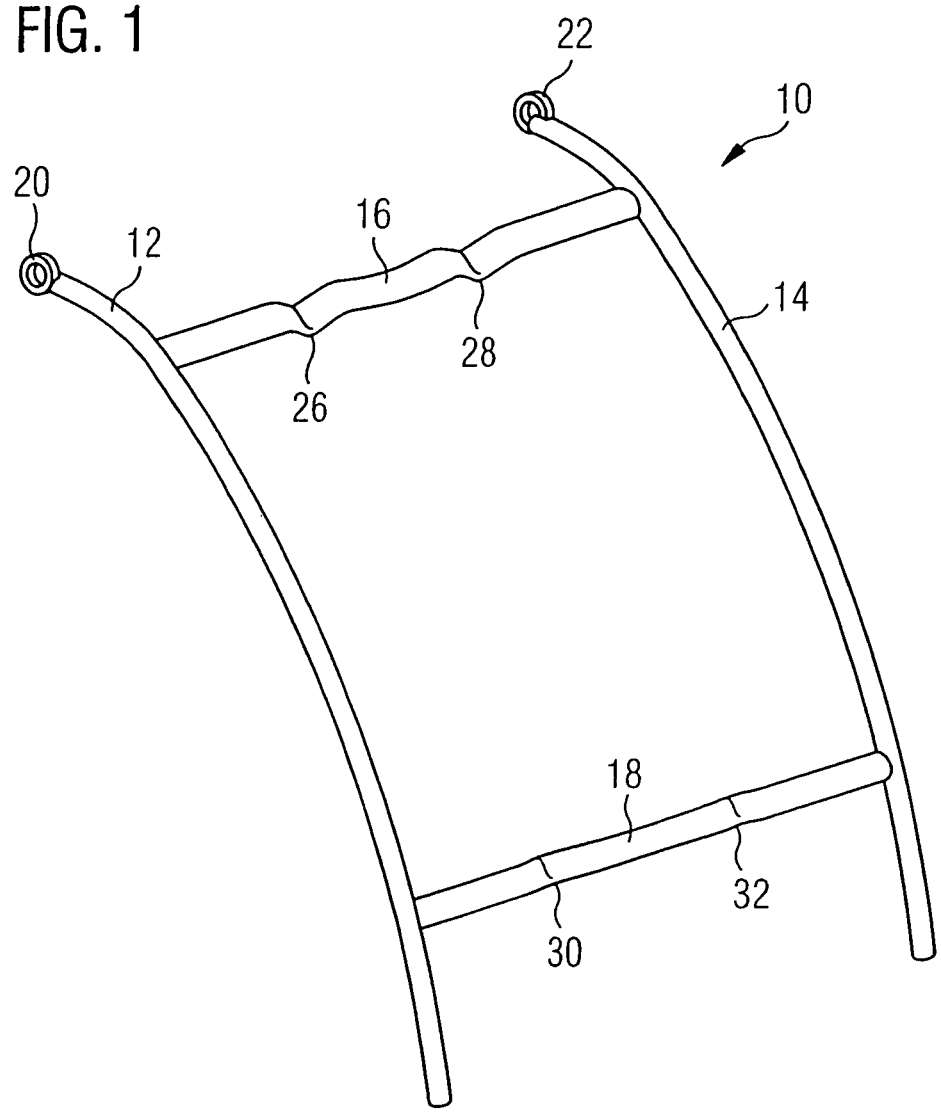

| | | | |
|---|---|---|---|
| 4,050,208 A | | 9/1977 | Pompei et al. |
| 4,310,132 A | * | 1/1982 | Frosch et al. ............... 244/119 |
| 5,242,523 A | * | 9/1993 | Willden et al. ............. 156/285 |
| 5,806,797 A | * | 9/1998 | Micale ......................... 244/120 |
| 5,810,178 A | | 9/1998 | Boette et al. |
| 5,893,534 A | * | 4/1999 | Watanabe .................... 244/119 |
| 6,114,012 A | * | 9/2000 | Amaoka et al. .............. 428/182 |
| 6,158,690 A | | 12/2000 | Wadey et al. |
| 6,364,250 B1 | * | 4/2002 | Brinck et al. ................ 244/119 |
| 6,499,692 B2 | | 12/2002 | Kelnhofer |
| 6,536,710 B1 | | 3/2003 | Bobzien et al. |
| 6,817,574 B2 | * | 11/2004 | Solanille et al. .......... 244/117 R |
| 6,883,753 B1 | | 4/2005 | Scown |
| 7,134,629 B2 | * | 11/2006 | Johnson et al. ............. 244/119 |
| 7,159,822 B2 | * | 1/2007 | Grantham et al. ........... 244/119 |
| 7,189,688 B2 | | 3/2007 | Williams et al. |
| 7,325,771 B2 | * | 2/2008 | Stulc et al. .................. 244/119 |
| 7,527,222 B2 | * | 5/2009 | Biornstad et al. ............ 244/120 |
| 2005/0082431 A1 | * | 4/2005 | Scown et al. ................ 244/119 |
| 2005/0263645 A1 | * | 12/2005 | Johnson et al. .............. 244/119 |
| 2006/0226287 A1 | * | 10/2006 | Grantham et al. ........... 244/119 |

FOREIGN PATENT DOCUMENTS

| | | |
|---|---|---|
| RU | 2 191 716 | 10/2002 |
| SU | 1 519 121 | 5/1996 |
| WO | WO 2008/022773 | 2/2008 |

OTHER PUBLICATIONS

English language translation of Decision on Granting from the Russian Federal Service for Intellectual Property Patents and Trademarks, Application No. 2009017853/11(010515), Feb. 6, 2012.

* cited by examiner

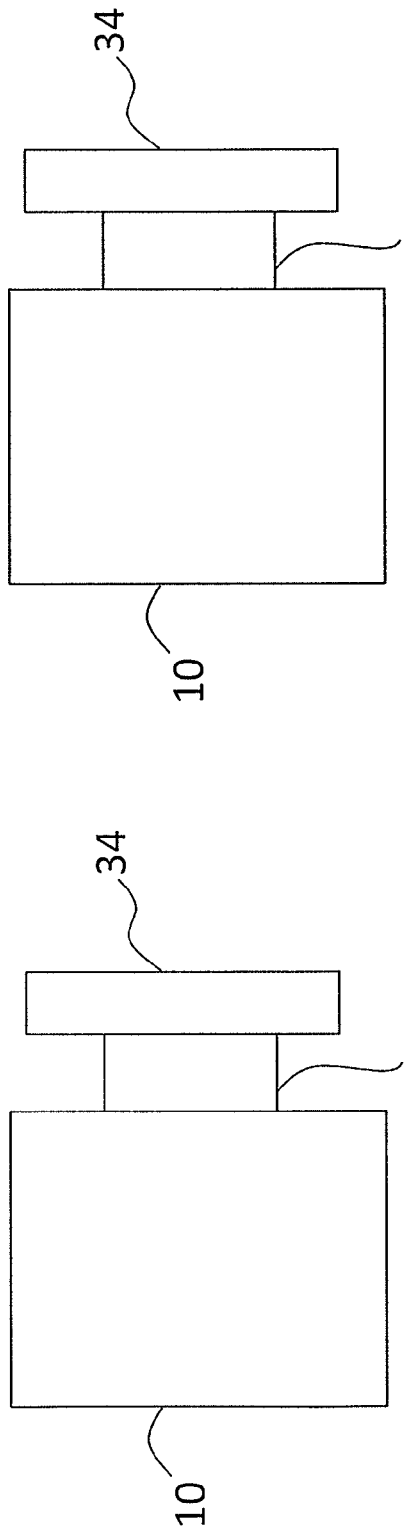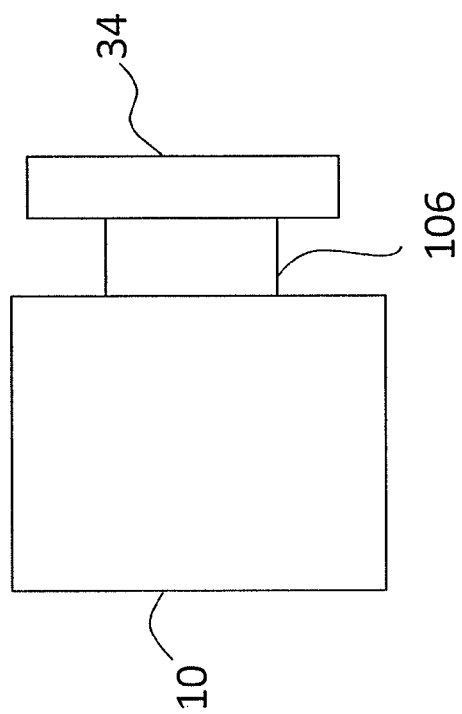
FIG. 11
FIG. 12
FIG. 13

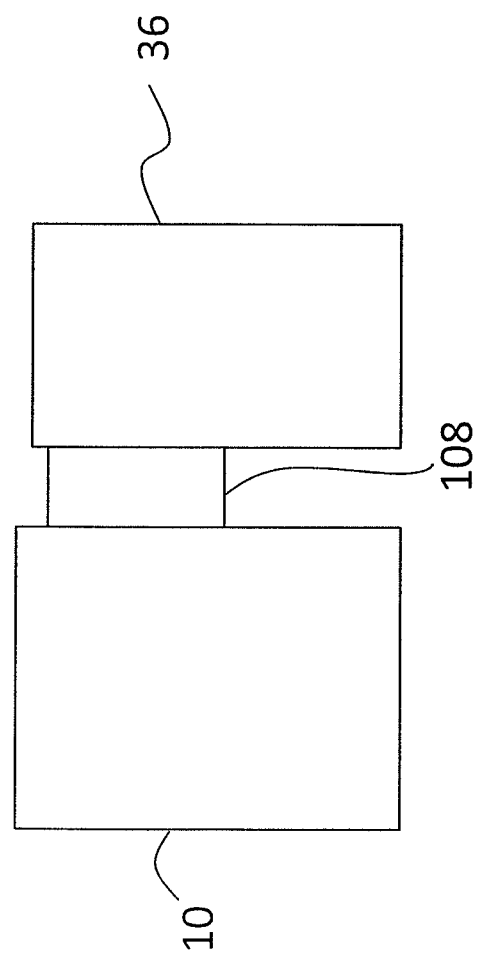

FRAME ELEMENT, AIRCRAFT COMPONENT ASSEMBLY SYSTEM AND METHOD OF FITTING A COMPONENT IN AN AIRCRAFT

The present application is a continuation application of PCT/EP2007/007362 filed Aug. 21, 2007, which claims priority to German Patent Application No. 10 2006 039 290.6, filed Aug. 22, 2006 and claims the benefit of U.S. Provisional Patent Application No. 60/827,355, filed Sep. 28, 2006, each of which is incorporated herein by reference.

The invention relates to a frame element for use in an aircraft component assembly system, to an aircraft component assembly system, and to a method of fitting a component, in particular an interior component or an insulation pack in an aircraft.

When fitting interior components in an aircraft the current practice is to connect the various components, such as e.g. dado panels, side trims, light strips and the like, individually to the aircraft structure. As each component has to be separately positioned and fastened to the aircraft structure, the fitting of interior components is often very time-consuming. Furthermore, changes to the position of individual interior components or design changes to the interior components are often achievable only with great difficulty because such changes as a rule involve adapting a holder on the aircraft structure side and/or at least adapting the fastening points provided on the aircraft structure for fitting the interior components.

Whereas the primary insulation is attached directly to the inside of the aircraft outer skin, insulation packs that form the secondary insulation of the aircraft are conventionally glued onto the interior components before these components are fastened to the aircraft structure. In order to reproduce the contour of the interior components, which is often of a curved design and provided with shoulders and the like, a plurality of differently shaped insulating packs are often required. The fitting of the secondary insulation is therefore time-consuming and cost-intensive.

The object underlying the invention is to provide a frame element for use in an aircraft component assembly system, an aircraft component assembly system, and a method of fitting at least one component, in particular an interior component or an insulation pack in an aircraft, which allow easy and rapid fitting of the component in the aircraft.

To achieve this object, a frame element according to the invention for use in an aircraft component assembly system is attachable to an aircraft structure and comprises at least one fastening device for fastening at least one aircraft interior component or at least one insulation pack to the frame element.

The frame element is preferably adapted so as to be screwfastened to the aircraft structure. For example, a fastening of the frame element to the aircraft structure by means of four screw connections is possible. For this purpose, there may be corresponding bores optionally provided with a thread in the aircraft structure and/or in the frame element.

To allow particularly easy fitting of the frame element to the aircraft structure, the frame element may also be adapted so as to be fastened at one end by a plug-in connection and at another end by a screw- or detent connection to the aircraft structure. A frame element of such a design would also be particularly easy to detach from the aircraft structure. Extremely easy assembly is achieved when a component of the frame element or the aircraft structure that is used to establish the plug-in connection is of an articulated design.

The frame element is preferably made of a lightweight, rigid material, such as for example aluminium, an aluminium alloy, GFRP, CFRP or some other carbon fibre material.

If the frame element according to the invention is used to connect an interior component to the aircraft structure, the interior component may first be fastened to the frame element, i.e. the frame element and the interior component may be preassembled into an assembly group that may be handled independently. If required, it is naturally also possible to attach a plurality of interior components to the frame element. Then the preassembled assembly group consisting of the frame element and the interior component(s) fastened thereto may be connected easily and rapidly to the aircraft structure.

A particular advantage of the frame element according to the invention is that it may be used as a carrier element for different interior components, i.e. interior components of differing shape and size. As a result, the number and arrangement of the fastening points provided on the aircraft structure for the interior components need be adapted no longer to different interior components but merely to a frame element carrying different interior components. The frame element according to the invention therefore allows an uncoupling of the fastening points provided on the interior components from the fastening points provided on the aircraft structure. Consequently, the number of fastening points provided for the interior components on the aircraft structure may be considerably reduced through the use of the frame element according to the invention. It is moreover possible to standardize the arrangement of the fastening points for the interior components on the aircraft structure.

Since through the use of the frame element according to the invention it is possible to dispense with an adjustment of the interior-component and the aircraft-structure fastening points, greater flexibility in the design of both the interior components and the aircraft structure is achieved. This greater flexibility may be utilized to optimize the weight of the interior components and/or of the aircraft structure.

If the frame element according to the invention is used to connect an insulation pack forming for example part of the secondary insulation of the aircraft to the aircraft structure, the insulation pack may likewise first be fastened to the frame element, i.e. the frame element and the insulation pack may be preassembled into an assembly group that may be handled independently. If required, it is naturally also possible is to attach a plurality of insulation packs to the frame element. Then the preassembled assembly group comprising the frame element and the insulation pack(s) fastened thereto may be connected easily and rapidly to the aircraft structure.

Through the use of the frame element according to the invention for fitting the insulation packs that form for example the secondary insulation of the aircraft it is possible to dispense with the laborious gluing of the insulation packs onto the interior components. In particular, compared to most aircraft interior components the frame element has a contour of a much simpler shape with no shoulders or the like, so that fewer separately designed insulation packs have to be installed. This allows a considerable cost saving.

As a fastening device for fastening an interior component to the frame element, there may be provided on the frame element a mounting, a clamp or a detent device, which may also be designed integral with the frame element. It is however alternatively also possible to fasten the interior component by means of screws or rivets to the frame element, in which case in the interior component and/or in the frame element there may be corresponding bores optionally provided with a thread.

A fastening device for fastening an insulation pack to the frame element is preferably adapted to fasten the insulation pack in a mechanically detachable manner to the frame element.

For example, the fastening device may be designed in the form of a Velcro fastener, a hook-and-loop strip, a mushroom-head strip or a fir-tree fastening device. An alternative possibility is also to fasten the insulation pack to the frame element with the aid of screws, rivets, clips, clamping devices, magnetic holders, press fasteners with springs, an expanding fastening device or a ball fastening device. It is further conceivable to suspend the insulation pack at fastening points provided on the frame element, or to make the insulation pack slightly larger than the frame element in order to be able to fold the insulation pack over the frame element and to fasten it by means of a rubber band to the frame element. Finally, the device for fastening the frame element according to the invention to the aircraft structure may also be designed such that it simultaneously allows a fastening of the insulation pack to the frame element.

According to a preferred embodiment of the invention, the frame element comprises two longitudinal struts disposed at least in sections substantially parallel to one another as well as at least one connecting strut extending between the longitudinal struts. The length of the longitudinal struts may be varied according to requirements. This means that the geometry of the frame element may also be varied in a desired manner. For example, the frame element may extend from a plane forming the floor of an aircraft cabin to a centre line of the aircraft cabin roof. Alternatively, a frame element is also conceivable that extends from one side of the plane forming the floor of an aircraft cabin to the opposite side of the plane forming the floor of an aircraft cabin, i.e. that spans both sides of the aircraft cabin as well as the aircraft cabin roof.

In dependence upon the length of the longitudinal struts, the frame element may comprise a corresponding number of connecting struts in order to guarantee an adequate rigidity of the frame element. In the fitted state of the frame element, the longitudinal struts of the frame element may extend parallel to ribs of the aircraft structure. The longitudinal struts therefore preferably have at least in sections a curvature that is adapted to a curvature of the ribs of the aircraft structure.

For example, the frame element may be so dimensioned that the longitudinal struts in the fitted state of the frame element extend parallel to adjacent ribs of the aircraft structure. Alternatively, however, the frame element may be of such a size that the distance between the longitudinal struts of the frame element is greater than the distance between two adjacent ribs of the aircraft structure. In this case, the connecting strut of the frame element is preferably provided with at least one recess, which after the attachment of the frame element to the aircraft structure interacts in such a way with a rib of the aircraft structure that the rib is received in the recess provided in the connecting strut. This is a simple way of preventing the rib, which in the fitted state of the frame element is disposed between the longitudinal struts of the frame element, from impeding the fastening of the frame element to the aircraft structure. If the frame element comprises a plurality of connecting struts, each connecting strut is preferably provided with at least one recess, which in the fitted state of the frame element receives a rib of the aircraft structure. In a particularly preferred embodiment of the frame element according to the invention, all of the connecting struts have two recesses for receiving two adjacent ribs.

On the frame element at least one force introduction apparatus of e.g. a shackle-shaped design is preferably formed for attaching the frame element to the aircraft structure. For example, on each longitudinal strut of the frame element at least one force introduction apparatus may be provided, through which a screw or a bolt may be passed for easy and secure connection of the frame element to the aircraft structure. In dependence upon the size of the frame element and/or the length of the longitudinal struts of the frame element, a plurality of force introduction apparatuses may be disposed distributed along the length of the longitudinal struts of the frame element in order to guarantee a secure fastening of the frame element to the aircraft structure.

In a preferred embodiment of the invention, the frame element is attachable to the aircraft structure via shock mounts. By shock mounts in the present context are meant bearing arrangements made of a vibration-damping material, for example a rubber-elastic material, which ensure a shock-free fastening of the frame element, and hence of the interior component attached to the frame element, to the aircraft structure. Fastening the frame element via shock mounts leads to an acoustic uncoupling of the frame element from the aircraft structure. The shock mounts may be positioned for example between the force introduction apparatuses formed on the frame element and the components of the aircraft structure, such as for example the ribs, that are provided for fastening the frame element. It is however possible for all of the previously described fastening devices for fastening the frame element to the aircraft structure to be equipped with corresponding shock mounts for the acoustic uncoupling of the frame element from the aircraft structure.

In the shock mounts suitable through-openings are preferably provided, which allow a screw or bolt to be passed through the shock mounts in order to fasten the frame element to the aircraft structure. Alternatively, suitable elastic bushes may be provided in the shock mounts for connecting the shock mounts to the frame element.

The frame element according to the invention preferably comprises a fastening module, on which the at least one fastening device for fastening at least one aircraft interior component is formed or disposed. As already mentioned, the interior component may be fastened by means of a mounting, a clamp or a detent device, but also by a screw- or rivet fastening to the frame element. The mounting, clamp or detent device may be either fitted on the fastening module or designed integral with the fastening module. If the interior component is to be screw-fastened or riveted to the frame element, there may be corresponding bores optionally provided with a thread in the fastening module.

The fastening module, which is designed integral with the frame element but may alternatively also be connected detachably to the frame element, is, in terms of its shape and size as well as in particular in terms of the shape and arrangement of the fastening device, adapted to the interior component that is to be attached to the frame element. Thus, in order to be able to use the frame element to fasten different interior components to the aircraft structure, the frame element merely has be provided with different fastening modules that are adapted to the different interior components. It is therefore possible for example also to fasten smaller interior components to the frame element, with the result that the frame element according to the invention is extremely versatile.

According to a particularly preferred embodiment of the invention, the frame element further comprises a further fastening device for fastening an insulation pack or an interior component to the frame element. In other words, the frame element is designed in such a way that it may be preassembled with at least one interior component and with at least one insulation pack forming for example part of the aircraft secondary insulation into an assembly group that may be handled independently. This assembly group may then easily be attached in the manner described above to the aircraft structure. The frame element in this case is preferably so designed that the interior component fastened to the frame element, in the fitted state of the assembly group consisting of the frame element, the interior component and the insulation pack, is disposed at a side of the frame element facing away from the aircraft structure. The insulation pack, on the other hand, in the fitted state of the assembly group may either be disposed between the frame element and the aircraft structure at a side of the frame element facing the aircraft structure or it may be fastened between the at least one interior component and the frame element at the side of the frame element facing away from the aircraft structure.

If the frame element according to the invention is intended to be connected to an interior component and an insulation pack to form an assembly group, the previously described fastening devices may be used as fastening devices for the interior component and the insulation pack. In particular, the interior component may be fastened to the frame element by means of a mounting, clamp or detent device that is optionally fitted or formed on a fastening module, and the insulation pack may be fastened to the frame element by means of a mechanically detachable fastening device, such as e.g. a Velcro fastener or an adhesive tape.

An aircraft component assembly system according to the invention may comprise a plurality of the previously described frame elements. Preferably, between adjacent frame elements of the aircraft component assembly system a gap cover is provided.

A method according to the invention of fitting a component in an aircraft comprises the steps of providing a previously described frame element, fastening at least one interior component or at least one insulation pack to the frame element and attaching the frame element having the at least one interior component or the at least one insulation pack fastened thereto to an aircraft structure.

The at least one interior component may be fastened to the frame element by means of a fastening device designed in the form of a mounting, a clamp or a detent device. Preferably, the interior component is fastened to the frame element by means of a fastening device that is formed or disposed on a fastening module provided on the frame element. The at least one insulation pack, on the other hand, is preferably fastened to the frame element by means of a fastening device that is adapted to fasten the insulation pack in a mechanically detachable manner to the frame element.

The frame element having the at least one interior component fastened thereto or having the at least one insulation pack fastened in a mechanically detachable manner thereto may be attached in such a way to the aircraft structure that a recess provided in a connecting strut of the frame element receives a rib of the aircraft structure. An insulation pack optionally disposed between the frame element and the aircraft structure is in this case possibly compressed in the region of the contact area of the insulation pack with the rib. The insulation material is however sufficiently elastic for this not to lead to damage of the insulation pack. Optionally, the insulation pack may also be provided with corresponding recesses for receiving the rib or some other component of the aircraft structure.

The frame element having the interior component or the insulation pack fastened thereto is preferably attached to the aircraft structure by means of a force introduction apparatus formed on the frame element, wherein such a force introduction apparatus is preferably provided on each longitudinal strut of the frame element.

The frame element having the at least one interior component or the at least one insulation pack fastened thereto may be attached to the aircraft structure via shock mounts.

Finally, the method according to the invention may provide that prior to attaching the frame element to the aircraft structure both at least one interior component and at least one insulation pack are fastened to the frame element.

Figure 2:
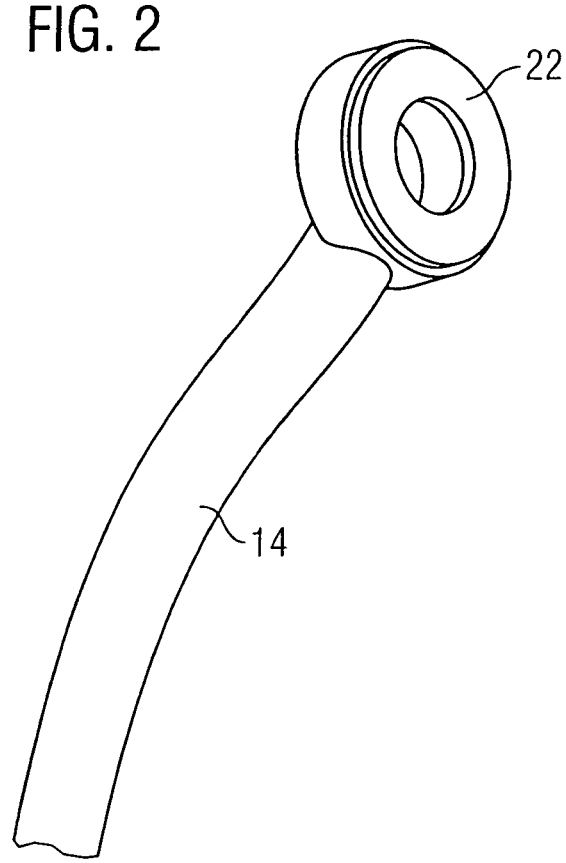
Figure 3:
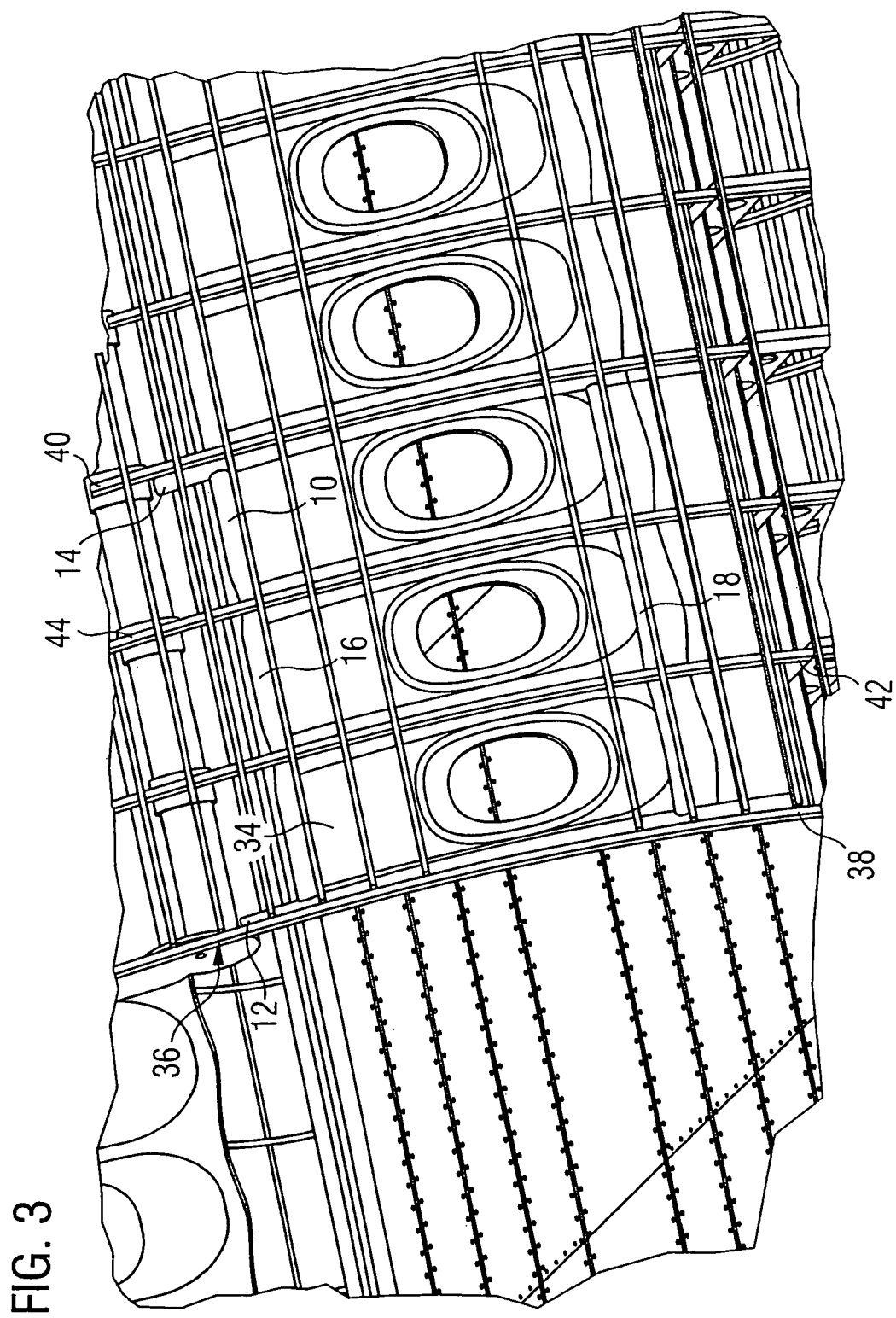
Figure 4:
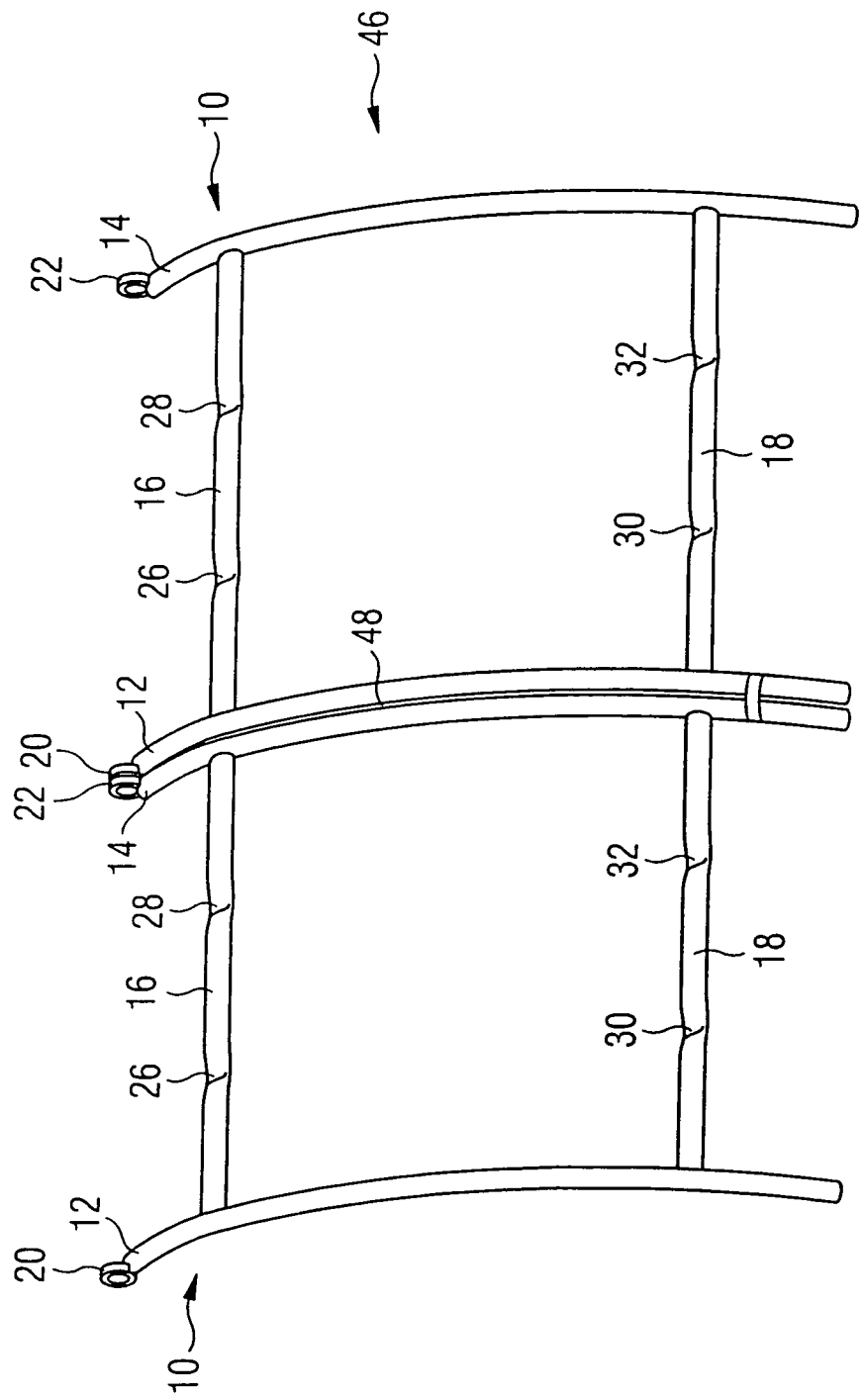
Figure 5:
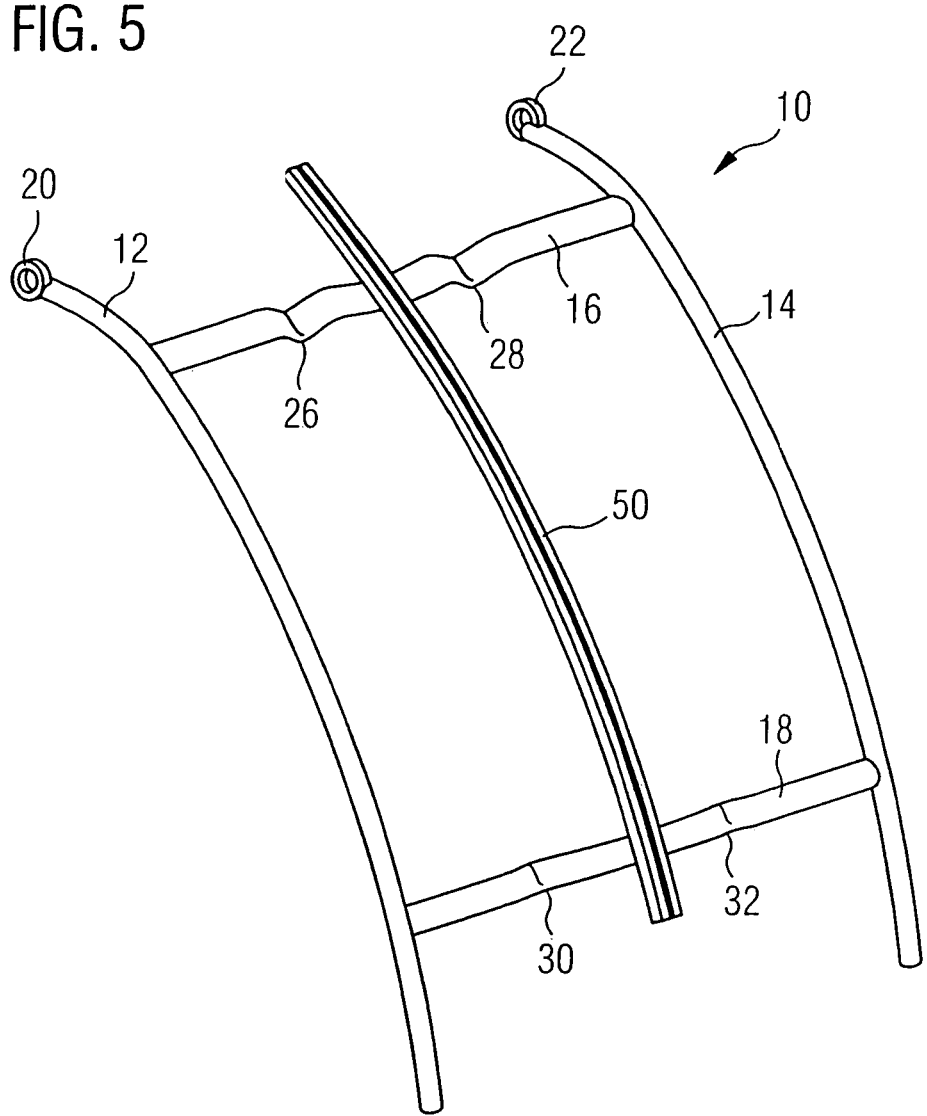
Figure 6:
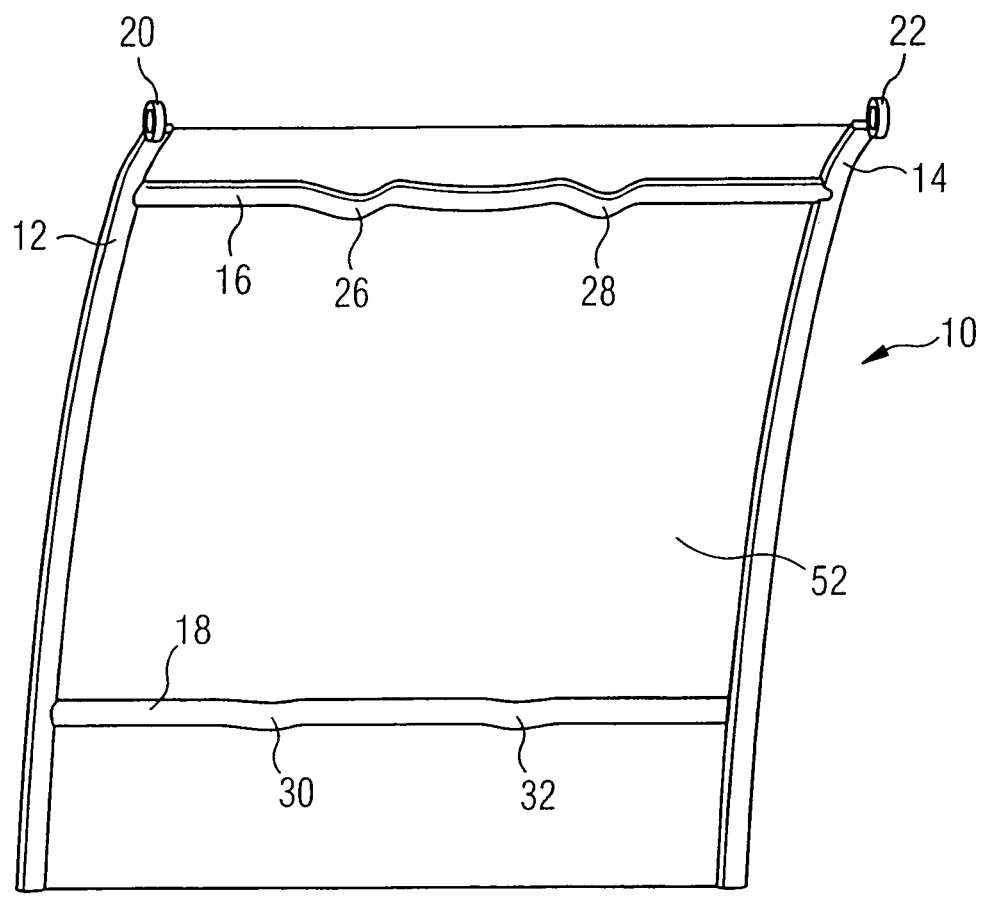
Figure 7:
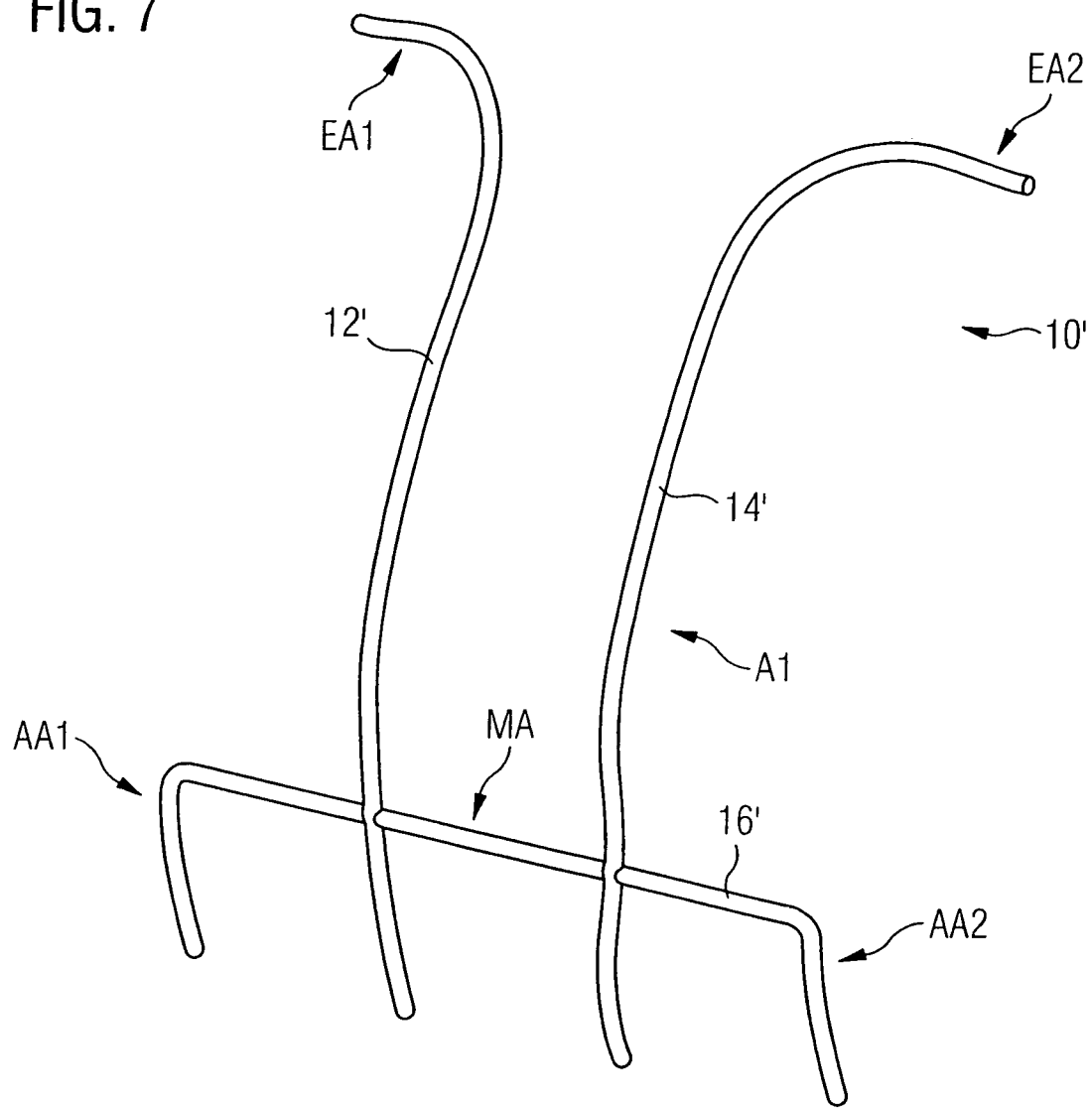
Figure 8:
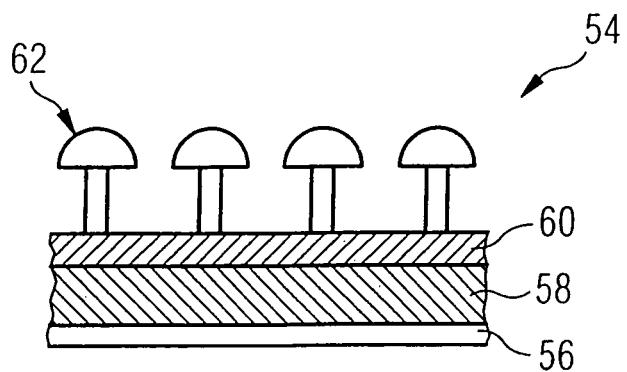
Figure 9:
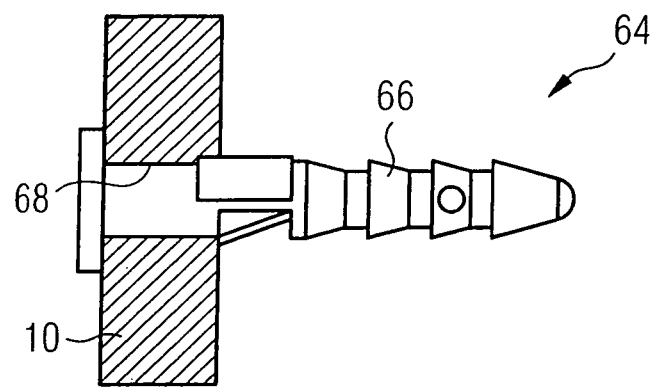
Figure 10:
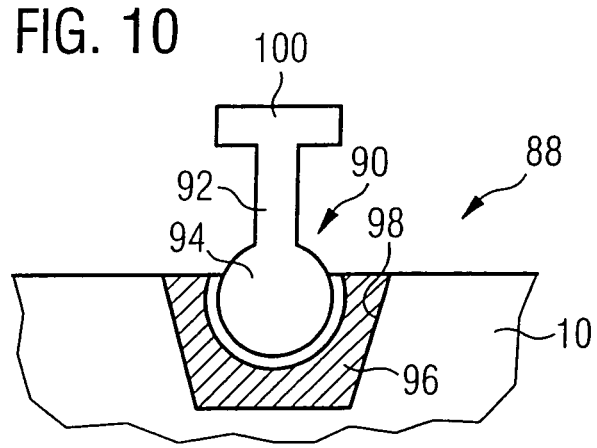

There now follows a detailed description of a preferred embodiment of the invention with reference to the accompanying diagrammatic drawings, wherein FIG. 1 shows a first embodiment of a frame element according to the invention, FIG. 2 shows a detail view of a force introduction apparatus disposed on a longitudinal strut of the frame element represented in FIG. 1, FIG. 3 shows the first embodiment of the frame element according to the invention having interior components fastened thereto, in the fitted state, FIG. 4 shows an aircraft component assembly system according to the invention comprising two frame elements, FIG. 5 shows the first embodiment of the frame element according to the invention with a fastening module for fastening an interior component to the frame element, FIG. 6 shows the first embodiment of the frame element according to the invention having an insulation pack fastened thereto, FIG. 7 shows a second embodiment of a frame element according to the invention, FIG. 8 shows a first embodiment of a fastening device for fastening the insulation pack to the frame element, FIG. 9 shows a second embodiment of a fastening device for fastening the insulation pack to the frame element, FIG. 10 shows a third embodiment of a fastening device for fastening the insulation pack to the frame element.

FIG. 11 shows an embodiment of an interior component fastened to a frame element with a mounting, FIG. 12 shows an embodiment of an interior component fastened to a frame element with a clamp, FIG. 13 shows an embodiment of an interior component fastened to a frame element with a detent device, FIG. 14 shows an embodiment of a frame element fastened to an aircraft structure via a shock mount.

FIG. 1 shows a first embodiment of a frame element 10 made of aluminium, which comprises two curved longitudinal struts 12, 14 disposed parallel to one another as well as two connecting struts 16, 18 extending parallel to one another between the longitudinal struts 12, 14. On a first end of each longitudinal strut 12, 14 of the frame element 10 there is formed a shackle-shaped force introduction apparatus 20, 22, which is represented in an enlarged detail view in FIG. 2. Each connecting strut 16, 18 of the frame element 10 is provided with two recesses 26, 28, 30, 32.

The frame element 10 comprises a fastening device, which is not shown in the drawings and is used to fasten an aircraft interior component 34, which may be seen in FIG. 3, to the frame element 10. As a fastening device for fastening the interior component 34 to the frame element 10 a mounting (shown as reference numeral 102 in FIG. 11), a clamp (shown as reference numeral 104 in FIG. 12) or a detent device (shown as reference numeral 106 in FIG. 13) may be used. It is however alternatively also possible to fasten the interior component 34 to the frame element 10 by means of screws or rivets, in which case in the interior component 34 and/or in the frame element 10 there are corresponding bores optionally provided with a thread. In the embodiment shown in FIG. 3, the interior component 34 fastened to the frame element 10 is a side trim panel. It is however also possible to attach other aircraft interior components, such as e.g. dado panels, ceiling trim panels, doorframe components, light strips etc., to the frame element 10.

By means of the force introduction apparatuses 20, 22 formed on the longitudinal struts 12, 14 of the frame element 10, the frame element 10 may be fastened to an aircraft structure 36 at a side of the aircraft structure 36 facing the interior of an aircraft. For this purpose, a screw is passed through each of the force introduction apparatuses 20, 22 formed on the longitudinal struts 12, 14 of the frame element 10 and is screwed into a bore, which is provided with a thread and formed in a rib 38, 40 of the aircraft structure 36. If a particularly secure fastening of the frame element 10 to the aircraft structure 36 is required, an additional fastening system may be provided.

The fastening of the frame element 10 to the aircraft structure 36 is effected via shock mounts (the shock mount shown as reference numeral 108 in the schematic depicted in FIG. 14), i.e. bearing arrangements made of a vibration-damping material that ensure a shock-free fastening of the frame element 10 to the aircraft structure 36. The shock mounts made of a rubber-elastic material are each provided with a through-opening, through which may be passed the screws that are used to fasten the assembly group consisting of the frame element 10 and the interior component 34 to the aircraft structure 36. By means of the shock mounts an acoustic uncoupling of the frame element 10 and hence of the interior component 34 from the aircraft structure 36 may be achieved.

As may be seen in FIG. 3, the curvature of the longitudinal struts 12, 14 of the frame element 10 is adapted in sections to a curvature of the ribs 38, 40 of the aircraft structure 36 so that the longitudinal struts 12, 14 of the frame element 10 in the fitted state of the frame element 10 extend in sections substantially parallel to the ribs 38, 40. Ribs 42, 44 lying between the ribs 38, 40 of the aircraft structure 36 are received in the recesses 26, 28, 30, 32 provided on the connecting struts 16, 18 of the frame element 10, thereby preventing the ribs 42, 44 from impeding the fastening of the frame element 10 to the aircraft structure 36.

A plurality of frame elements 10 form an aircraft component assembly system 46. An aircraft component assembly system 46 comprising two frame elements 10 is shown in FIG. 4. Between adjacent frame elements 10 of the aircraft component assembly system 46 there is a gap cover 48.

FIG. 5 shows a frame element 10, which comprises a fastening module 50 designed in the form of a curved strut that is attached to the frame element 10. Formed on the fastening module 50 is a fastening device, which is not shown in FIG. 5, for fastening an aircraft interior component to the fastening module 50 and hence to the frame element 10. As described in connection with FIGS. 1 and 3, the fastening device may take the form of a mounting, a clamp or a detent device. Alternatively, the interior component may however be connected by a screw- or rivet fastening to the fastening module 50 and hence to the frame element 10.

The fastening module 50 is, in terms of its shape and size as well as in terms of the shape and arrangement of the fastening device provided on the fastening module 50, adapted to the interior component that is to be attached to the frame element 10. Furthermore, the curvature of the fastening module 50 is adapted to a curvature of ribs of an aircraft structure, thereby allowing the frame element 10 to be fastened without difficulty to the aircraft structure at a side of the aircraft structure facing an interior of an aircraft.

A frame element 10 shown in FIG. 6 has, in addition to the fastening device for fastening an aircraft interior component, a further fastening device (not shown in FIG. 6) for the mechanically detachable fastening of an insulation pack 52, which forms part of an aircraft secondary insulation, to the frame element 10. The frame element 10, the fastening device for fastening an aircraft interior component and the further fastening device for fastening the insulation pack 52 are designed and disposed in such a way that the interior component may be fastened at a first side of the frame element 10 facing an interior of an aircraft in the fitted state of the frame element 10, while the insulation pack 52 may be attached at a second side of the frame element 10 facing away from the interior of the aircraft in the fitted state of the frame element 10.

In the fitted state of an assembly group consisting of the frame element 10, the interior component and the insulation pack 52, the insulation pack 52 is disposed between the frame element 10 and an aircraft structure, with the result that the insulation pack 52 is possibly compressed in the region of the contact area of the insulation pack 52 with a rib or some other component of the aircraft structure. The material of the insulation pack 52 is however sufficiently elastic for this not to lead to damage of the insulation pack 52. Alternatively, the insulation pack 52 may also be provided with corresponding recesses for receiving a rib or some other component of the aircraft structure.

FIG. 7 shows a second embodiment of a frame element 10' made of aluminium. The frame element 10' comprises two longitudinal struts 12', 14', which in a first portion A1 extend substantially parallel to one another. In a similar manner to the frame element 10 shown in FIGS. 1 to 6, a curvature of the longitudinal struts 12', 14' in the first portion A1 is adapted to the curvature of the ribs of the aircraft structure. In contrast to the frame element 10 shown in FIGS. 1 to 6, however, the longitudinal struts 12', 14' of the frame element 10' according to FIG. 7 have end portions EA1, EA2 that are each curved outwards through an angle of ca. 90°, with the result that each longitudinal strut 12', 14' is of a substantially L-shaped design.

The frame element 10' further comprises a connecting strut 16'. A middle portion MA of the connecting strut 16' extends between the longitudinal struts 12', 14'. The connecting strut 16' further comprises two outer portions AA1, AA2, which each extend outwards from the longitudinal struts 12', 14' and in a part adjoining the longitudinal struts 12', 14' initially form an extension of the middle portion MA of the connecting strut 16' but are then curved through an angle of ca. 90° and extend substantially parallel to the longitudinal struts 12', 14'. The connecting strut 16' of the frame element 10' is therefore of a substantially C-shaped design.

Like the frame element 10, the frame element 10' also comprises a fastening device, which is not shown in FIG. 7 and is used to fasten an aircraft interior component to the frame element 10'. There is moreover a further fastening device, which is not shown in FIG. 7, for the mechanically detachable fastening of an insulation pack, which forms part of an aircraft secondary insulation, to the frame element 10'.

FIGS. 8 to 10 show various embodiments of a further fastening device for fastening the insulation pack 52 to a frame element 10, 10'.

In FIG. 8 the further fastening device is designed in the form of a mushroom-head strip 54, which comprises a protective paper layer 56, a self-adhesive neoprene foam layer 58 disposed on top of the protective paper layer 56, and a polyolefin layer 60 disposed on top of the neoprene foam layer 58. A plurality of mushroom-head devices 62 extend in a substantially vertical direction from the polyolefin layer 60. To fasten the mushroom-head strip 54 to the frame element 10, 10' the protective paper layer 56 is removed to allow the mushroom-head strip 54 to be affixed to the frame element 10 by means of the self-adhesive neoprene foam layer 58. The insulation pack 52 may finally be fastened in a mechanically detachable manner to the frame element 10, 10' by virtue of the mushroom-head devices 62 latching in the insulation material of the insulation pack 52.

FIG. 9 shows a further fastening device designed in the form of a fir-tree fastening device 64. The fir-tree fastening device 64 comprises a plurality of fir-tree devices 66, which are received in bores 68 formed in the frame element 10 and extend in a substantially vertical direction from the frame element 10, 10'. The insulation pack 52 may be fastened in a mechanically detachable manner to the frame element 10, 10' by virtue of the fir-tree devices 66 latching in the insulation material of the insulation pack 52.

A further fastening device, which is not shown in the drawings and is designed in the form of an expanding fastening device, comprises a plurality of retaining knobs, which each comprise a head as well as a base extending from the head. The base of the retaining knobs is adapted to be received in a recess formed in the frame element 10, 10'. To fasten a retaining knob to the frame element 10, the base of the retaining knob is introduced into the recess formed in the frame element 10, 10'. Then the retaining knob is rotated in increments of 15° until projections formed on the base interact with complementary devices, which are provided in the recess formed in the frame element 10, 10'. Finally, a locking cylinder disposed on the head of the retaining knob is pressed downwards until it interacts with a locking pin disposed in the interior of the head. The insulation pack 52 may finally be fastened to the frame element 10, 10' with the aid of screws, which interact with threads formed in the heads of the retaining knobs.

FIG. 10 finally shows a further fastening device designed in the form of a ball fastening device 88. The ball fastening device 88 comprises a plurality of ball mountings 90 each comprising a cylindrical bolt 92. Disposed on one end of the bolt 92 is a ball 94 that is arranged so as to be received in a recess 98, which is formed in the frame element 10, 10' and lined with a rubber insert 96. To fasten the insulation pack 52 to the frame element 10, 10', the insulation material of the insulation pack 52 is clamped between a mounting 100, which is formed on an opposite end of the bolt 92, and the surface of the frame element 10, 10'.

During assembly of the frame element 10, 10', first a desired interior component 34 is fastened to the frame element 10, 10'. Then an insulation pack 52 forming part of an aircraft secondary insulation is attached in a mechanically detachable manner to the frame element 10, 10'.

The assembly group consisting of at least one interior component 34, at least one frame element 10, 10' and at least one insulation pack 52 is then screw-fastened to the aircraft structure 36. For the acoustic uncoupling of the assembly group consisting of the interior component 34, the frame element 10, 10' and the insulation pack 52 from the aircraft structure 36, the fastening is effected via shock mounts.

The invention claimed is:

1. An apparatus, comprising:
a frame element for use in an aircraft component assembly system, wherein the frame element is removably attachable to an aircraft structure as an integrated modular unit, the aircraft structure comprising a first and a second rib, and includes:
at least one fastening device for fastening an aircraft interior component to the frame element;
two longitudinal struts disposed at least in sections substantially parallel to one another, each of the longitudinal struts having an elongate shape that extend along an elongate direction in their respective lengths which is greater than a cross sectional dimension of each strut in width or height; and
at least one connecting strut configured to connect the two longitudinal struts, each connecting strut defining:
a first recess located between and offset from the two longitudinal struts, and configured to receive the first rib of the aircraft structure when the frame element is attached to the aircraft structure; and
a second recess located between and offset from the two longitudinal struts, and configured to receive the second rib of the aircraft structure when the frame element is attached to the aircraft structure;
wherein the longitudinal struts extend at least in longitudinal sections thereof along the elongate direction substantially parallel to an elongate direction the first and second ribs of the aircraft structure when the frame element is attached to the aircraft structure, the elongate direction of the first and second ribs extending along an elongate shape of the ribs in length greater than a cross sectional dimension of width or height of the ribs.

2. The apparatus of claim 1, wherein the at least one fastening device for fastening the at least one aircraft interior component to the frame element is designed in the form of a mounting, a clamp or a detent device.

3. The apparatus of claim 2, wherein the frame element comprises the two longitudinal struts disposed at least in sections substantially parallel to one another as well as the at least one connecting strut extending at least in sections between the longitudinal struts.

4. The apparatus of claim 2, wherein on each longitudinal strut of the frame element at least one force introduction apparatus is formed for attaching the frame element to the aircraft structure.

5. The apparatus claim 2, wherein the frame element is attachable to the aircraft structure via shock mounts.

6. The apparatus of claim 1, wherein the at least one fastening is adapted to fasten an insulation pack in a mechanically detachable manner to the frame element.

7. The apparatus of claim 1, wherein each longitudinal strut of the frame element includes at least one force introduction apparatus having an opening formed therethrough proximate one end thereof for attaching the frame element to the aircraft structure.

8. The apparatus of claim 1, wherein the frame element is attachable to the aircraft structure via shock mounts formed at least partially from an elastic material.

9. The apparatus of claim 1, wherein the frame element comprises a fastening module formed as an elongate curved strut, on which the at least one fastening device for fastening at least one aircraft interior component is formed or disposed.

10. The apparatus of claim 1, wherein the frame element further comprises at least one further fastening device for fastening at least one insulation pack or at least one interior component to the frame element.

11. Aircraft component assembly system, comprising a plurality of frame elements according to claim 1.

12. Aircraft component assembly system according to claim 11, wherein between adjacent frame elements of the aircraft component assembly system a gap cover is provided.

13. Method of fitting a component in an aircraft comprising the steps:
providing a frame element according to claim 1,
fastening at least one interior component or at least one insulation pack to the frame element and attaching the frame element having the at least one interior component or the at least one insulation pack fastened thereto to an aircraft structure, wherein the frame element having the at least one interior component or the at least one insulation pack fastened thereto is attached in such a way to the aircraft structure that the first recess provided in the at least one connecting strut of the frame element receives the first rib of the aircraft structure, and the two longitudinal struts of the frame element having an elongate shape that extend along an elongate direction in respective lengths which is greater than a cross sectional dimension of each strut in width or height, the longitudinal strut also extending at least in longitudinal sections thereof along the elongate direction parallel to the rib of the aircraft structure.

14. Method according to claim 13, wherein the at least one interior component is fastened to the frame element by a fastening device designed in the form of a mounting, a clamp or a detent device.

15. Method according to claim 13, wherein the at least one insulation pack is fastened to the frame element by a fastening device that is adapted to fasten the insulation pack in a mechanically detachable manner to the frame element.

16. Method according to claim 13, wherein the frame element having the at least one interior component or the at least one insulation pack fastened thereto is attached to the aircraft structure by a force introduction apparatus that is formed on each longitudinal strut of the frame element.

17. Method according to claim 13, wherein the frame element having the at least one interior component or the at least one insulation pack fastened thereto is attached to the aircraft structure via shock mounts.

18. Method according to claim 13, wherein the at least one interior component is fastened to the frame element by a fastening device that is formed or disposed on a fastening module, which is provided on the frame element.

19. Method according to claim 13, further including: as a result of the fastening, the frame element further includes the other of the at least one interior component and the at least one insulation pack.

20. The apparatus of claim 1, wherein the at least one connecting strut comprises a plurality of the connecting struts, and wherein each of the plurality of connecting struts is offset from another of the plurality of connecting struts.

* * * * *